(12) United States Patent
Sasin et al.

(10) Patent No.: US 6,185,419 B1
(45) Date of Patent: *Feb. 6, 2001

(54) COMMUNICATIONS SYSTEM AND METHOD FOR TESTING OF A COMMUNICATIONS APPARATUS

(75) Inventors: Tiberius Sasin; Steffen Hermanns, both of Aachen (DE)

(73) Assignee: Telefonaktiebolaget LM Ericsson, Stockholm (SE)

( * ) Notice: Under 35 U.S.C. 154(b), the term of this patent shall be extended for 0 days.

This patent is subject to a terminal disclaimer.

(21) Appl. No.: 08/987,376

(22) Filed: Dec. 9, 1997

(30) Foreign Application Priority Data

Dec. 10, 1996 (DE) ............................................. 196 51 275

(51) Int. Cl.$^7$ ........................... H04Q 7/20; H04B 17/00; H04M 1/24

(52) U.S. Cl. ...................... 455/423; 455/67.1; 455/67.4; 379/1; 375/224; 370/241

(58) Field of Search .................................. 455/423, 67.1, 455/67.4; 379/5, 6, 9, 10, 15, 27, 29, 1; 375/224; 370/241

(56) References Cited

U.S. PATENT DOCUMENTS

| | | | |
|---|---|---|---|
| 4,707,849 | 11/1987 | Rault et al. | 379/28 |
| 4,927,789 | 5/1990 | Shirley, Jr. et al. | 455/67 |
| 5,295,177 | * 3/1994 | Kakemizu et al. | 379/17 |
| 5,481,588 | * 1/1996 | Rickli et al. | 455/423 |
| 5,490,204 | 2/1996 | Gulledge | 455/423 |
| 5,504,800 | * 4/1996 | Yehushua et al. | 379/27 |
| 5,706,328 | * 1/1998 | Williman | 379/1 |
| 5,809,108 | * 9/1998 | Thompson et al. | 379/15 |
| 5,835,566 | * 11/1998 | Cowgill | 379/10 |
| 5,875,397 | * 2/1999 | Sasin et al. | 455/423 |

FOREIGN PATENT DOCUMENTS

| | | | |
|---|---|---|---|
| 32 11 967 A1 | 10/1983 | (DE) | H04Q/1/20 |
| 32 12 006 C2 | 1/1984 | (DE) | H04Q/1/20 |
| 32 40 660 A1 | 5/1984 | (DE) | H04M/1/24 |

(List continued on next page.)

OTHER PUBLICATIONS

Werner Rosar, "Teststrategien, Messgerate und–Systeme im GSM–Teil 1", NTZ Nachrichtentechnische Zeitschrift, vol. 47, No. 9, Sep. 1994, pp. 654–658.

Werner Rosa, "Teststrategien, Messgerate und–Systeme im GSM–Teil 2", NTZ Nachrichtentechnische Zeitschrift, vol. 47, No. 10, Oct. 1, 1994, pp. 726–730.

Primary Examiner—Dwayne D. Bost
Assistant Examiner—Raymond B. Persino
(74) Attorney, Agent, or Firm—Burns, Doane, Swecker & Mathis, L.L.P.

(57) ABSTRACT

The present invention concerns a communications system (KS) comprising a communications apparatus and a test apparatus (TV) for testing of the communications apparatus, as well as a method for testing of a communications apparatus (KS). The communications apparatus comprises a plurality of telephones ($T_1$ to $T_n$), a plurality of electrical connection lines, as well as at least a transmission station (UEV) for transmitting signals in the telephone communications system (KS). The test apparatus (TV) comprises a central signal processing apparatus (ZV), which supplies the test instructions, and a converter apparatus (WV) connected with a programmable data processing apparatus (S), which is constructed so as to convert digital test signals generated by the programmable data processing apparatus (S) under the control of the test instructions into operating signals, whereby an interrupt apparatus (UV) connected with the converter apparatus (WV) is constructed so as to interrupt, depending on the operating signals, at least one of the electrical connection lines for a period of time determined by the operating signals, whereby signal changes are produced on the basis of the systematic interruptions in the telephone communications system (KS), which are able to be signaled by comparison with the corresponding reference signal changes.

22 Claims, 11 Drawing Sheets

FOREIGN PATENT DOCUMENTS

Figure 1:
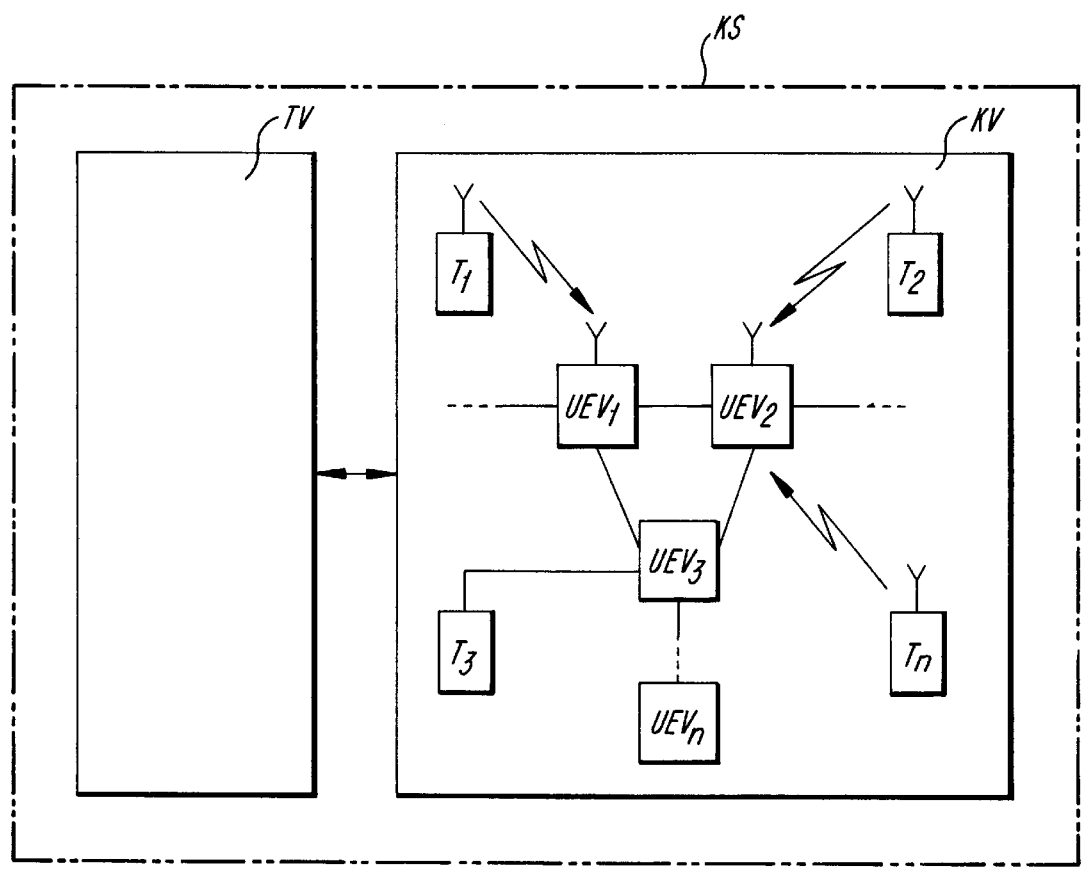

| | | | | |
|---|---|---|---|---|
| 34 28 921 A1 | 2/1986 | (DE) | | H04B/17/00 |
| 35 02 564 A1 | 7/1986 | (DE) | | H04Q/1/20 |
| 37 06 406 A1 | 9/1988 | (DE) | | H04M/1/24 |
| 37 43 959 A1 | 7/1989 | (DE) | | H04Q/1/20 |
| 39 07 237 A1 | 9/1990 | (DE) | | H04M/1/24 |
| 41 24 617 A1 | 1/1993 | (DE) | | H04B/17/00 |
| 41 36 817 A1 | 5/1993 | (DE) | | H04Q/1/20 |
| 42 05 239 A1 | 8/1993 | (DE) | | H04B/17/00 |
| 42 33 222 A1 | 4/1994 | (DE) | | G01R/29/00 |
| 43 33 391 C1 | 2/1995 | (DE) | | H04B/17/00 |
| 43 40 968 C1 | 2/1995 | (DE) | | H04M/1/24 |
| 43 30 705 A1 | 3/1995 | (DE) | | H04B/17/00 |
| 44 38 650 A1 | 5/1995 | (DE) | | H04B/17/00 |
| 43 11 910 C2 | 8/1995 | (DE) | | H04M/1/24 |
| 195 29 156 A1 | 2/1996 | (DE) | | H04B/17/00 |
| 44 42 613 A1 | 6/1996 | (DE) | | H04B/17/00 |
| 195 17 393 C1 | 10/1996 | (DE) | | H04B/17/00 |
| 0 353 759 A2 | 2/1990 | (EP) | | H04B/7/26 |
| 0 418 853 A2 | 3/1991 | (EP) | | H04Q/7/04 |
| 0 539 750 A2 | 10/1992 | (EP) | | H04B/17/00 |
| 0619687 | 10/1994 | (EP) . | | |
| 0 689 306 A2 | 12/1995 | (EP) | | H04B/17/00 |
| 0 734 191 A1 | 9/1996 | (EP) | | H04Q/7/20 |
| 170878 B | 3/1997 | (HU) . | | |
| 217 143 B | 3/1998 | (HU) . | | |
| WO 92/03003 | 2/1992 | (WO) | | H04M/1/24 |
| WO 94/00932 | 1/1994 | (WO) | | H04B/17/00 |

\* cited by examiner

COMMUNICATIONS SYSTEM AND METHOD FOR TESTING OF A COMMUNICATIONS APPARATUS

The present invention concerns a communications system consisting of a communications apparatus and of a test apparatus for testing of the communications apparatus, as well as a method for testing of a communications apparatus.

Telephone communications apparatuses can be built up with permanently connected telephones or with mobile telephones or a combination of the two.

The basic constituent parts of a mobile telephone communications apparatus are mobile telephones and base apparatuses having transmission stations. Thus, the mobile telephones which are in operation stay in connection with a respective one of the transmission stations via radio signals. Between the transmission stations themselves or also permanent line connections can be provided. Such a communications apparatus normally also has interfaces to change for example permanent communications apparatuses with which telephones are connected via fixed lines.

Dialing a call number from a mobile telephone will create a connection from the mobile telephone to the nearest lying transmission station, which for its part establishes the connection to the desired subscriber either via other transmission stations or via an interface to another communications system.

In order to make sure that a mobile telephone can always make a connection to a transmission station, the transmission stations must be so arranged that their catchment areas cover an area completely. It must further be ensured that a call is not interrupted if one of the participating mobile telephones moves out of the catchment area of a transmission station (also known as a cell). For these cases, handover procedures are provided in order to hand a call connection from the transmission station of a first cell to a mobile telephone to the transmission station of a second cell, if a mobile telephone moves from the first to the second cell.

Furthermore, the mobility of the user causes requests to come through that, unlike in a permanent network, in which a call can simply be directed to another permanent user network address, in a mobile telephone network, the place of a called mobile telephone must be established (paging) before initiation of a call and that, depending on a location of the mobile telephone in relation to a transmission station and depending on the geography (city, countryside), otherwise strong signals are weakened.

Moreover, customer service facilities, like for example, conference switching, voicemail services, data transmission, etc., must be provided in a mobile telephone communications system, which must be partially able to be activated by the respective telephones.

A mobile telephone communications apparatus is therefore a complex system, which is usually established and operated by an interaction of hardware and software components.

Standardized guidelines for a mobile communications system are laid down for example in the Global System for Mobile Communications (GSM). GSM specifies the features of a network, like, for example, the communications protocol between mobile telephones and transmission stations, the handover of a call between transmission stations, the requirements of a mobile telephone of a customer of a network operator in the network of another operator, speech and data services, connections to available networks, to ISDN-services and a range of other user service provisions.

The complexity of a mobile telephone communications system demands the possibility of specific testing of individual components or of the complete system. Extensive tests are carried out for localizing software and hardware faults appearing in the system during operation, prior to the release of the system and prior to the release of a further development of the system. In the prior art, a range of different test strategies have been developed, in order to carry out the testing of communications systems effectively. One of these test methods is the so-called "black box testing" in which the operation of the system in reaction to a defined interference in the system is analysed, without making any reference to the internal construction of the system.

DE 3 211 967 describes a switching arrangement for an apparatus with which different operating and test sequences are effected in a telephone exchange system or in an apparatus connected thereto, and an unusual pattern is displayed, in particular apparatuses used for the simulation of traffic in telephone exchange systems and fitted with corresponding subscriber simulations. Typical system functions such as "engaging", "dialing", "calling" and "speaking", can be reproduced or simulated by means of these subscriber simulations. Certain tone voltages generated by a level generator are applied to the subscriber simulations in accordance with the permanently predetermined test program of a program-controlled test apparatus. Monitoring takes place by rating the transmitted audible tones, the call current and, if necessary, dialing pulses.

The method described in DE 32 119 67 suffers, for example, from the disadvantage that hardware errors cannot be simulated. Hardware errors for localizing transmission station errors that have arisen during operation or for testing the communication system are currently localized within the system by removing or reinserting complete slide-in units e.g. of a transmission station and by analyzing operational sequences.

Yet this method neither assists the reproducibility of test cases nor does it support the precision necessary in temporally critical situations in order to verify that an error has been eliminated when a series of tests must be repeatedly performed, e.g. for approving the system's further developments, or when a test sequence has led to incorrect results and the same test situation has to be generated once again. The reproduction of a test case is necessary with very accurate time specifications, such as for regression tests, particularly in a real-time system, such as a communications system.

It is also time-consuming to perform test cases manually and necessitates the presence of test personnel at the apparatus to be tested; as a result of this, hardware components can for example be removed and reinserted and telephones can be operated, if necessary by hand.

The removal of hardware components of a transmission station also merely permits a "test granularity", i.e. the fineness of the screen with which an error can be localized, corresponding to the removed hardware components.

It is therefore an object of the invention to provide a communications system as well as a method for testing of a telephone communications apparatus, in which the tests should be repeatable with a specific time period, as well as with greater accuracy and which can be carried out in a time-saving fashion.

According to one aspect, the invention provides a communications system, comprising: a telephone communications apparatus that contains a plurality of telephones, particularly mobile telephones, a plurality of electrical connection lines, as well as at least one transmission station for transmitting signals in said telephone communications apparatus; a test apparatus for testing said telephone communications apparatus in an operational load condition, comprising: a central signal processing apparatus having at least one programmable data processing apparatus by which said test commands for testing said telephone communication apparatus are supplied; and a converter apparatus connected to said programmable data processing apparatus and designed to convert digital signals, generated by said programmable data processing apparatus by controlling said test commands, into said operating signals; and at least one interrupt apparatus connected to said converter apparatus and designed to interrupt systematically, in accordance with said operating signals, individual or groups of electrical connection lines for time intervals predetermined by said operating signals of said converter apparatus, wherein on account of said systematic interruptions in said telephone communication apparatus, signal changes are produced which can be signaled when there is a deviation from the associated reference signal changes.

According to another aspect, the invention provides a method of testing, under operational load conditions, a telephone communications apparatus which contains a plurality of telephones, particularly mobile telephones, a plurality of electrical connection lines and at least one transmission station for transmitting signals in said telephone communication apparatus, comprising the steps: generating and executing test instructions with a programmable data processing apparatus of a central signal processing apparatus for testing said telephone communication apparatus; transmitting digital test signals generated according to said test commands to a converter apparatus and converting said digital test signals into operating signals for systematically interrupting at least one electrical connection line of said plurality of electrical connection lines; transmitting said operating signals from said converter apparatus to an interrupt apparatus and operationally controlling said interrupt apparatus according to said operating signals to interrupt at least one electrical connection line for time intervals predetermined by said operating signals, comparing the actual signal changes produced on account of said systematic interruptions with the associated reference signal changes and signaling deviations of said actual signal changes from said reference signal changes.

The interrupt apparatus consists of a plurality of controlled switches that are operated by the programmable data processing apparatus of the central signal processing apparatus in a program-controlled manner. As a result, individual or groups of electrical connection lines in the transmission station or between various transmission stations can be interrupted for defined time slots. A very high test granularity can also be achieved, i.e. errors can be exactly localized. An operational load condition can be generated for example by a load generator that simulates a plurality of calls. A predetermined basic network load is generated by the load generator during testing.

When testing a telephone communications apparatus under operational load conditions, test instructions are generated with a programmable data processing means (S), digital test signals generated according to the test instructions are transmitted to a converter apparatus (WV) and are converted into operating signals for systematic interruption of at least one of the electrical connection lines of the plurality of electrical connection lines. The operating signals are transmitted from the converter apparatus (WV) to an interrupt apparatus (UV) and the interrupt apparatus interrupts at least one of the electrical connection lines for a period in time determined by the operating signal. The actual signal changes produced on the basis of the systematic interruptions are compared with the corresponding reference signal changes, and deviations of the actual signal changes from the reference signal changes are indicated.

The software-controlled carrying out of tests also means that tests can be carried out off-line, i.e. the point in time at which the program is carried out can be chosen as desired, for example at night.

The interrupt apparatus can be arranged between the circuit card or cards and the circuit card mount of the transmission station or on the front sides of the transmission station circuit cards inserted into the circuit card mount. The interrupt apparatus can also be arranged between various transmission stations and several interrupt apparatuses can likewise be arranged in this particular manner.

A further general advantage is for it to be also possible to provide hardware components and configuration files stored in memory apparatuses, by means of which the mobile telephones and/or the fixed telephones, of a different type as well, e.g. manufactured by different companies, can be operated and monitored automatically via an interface. In this way, subscribers and their behavior can be simulated by controlling the keyboard and microphones as well as by tapping into the call apparatuses and loudspeakers of telephones. In this way, it is also possible to simulate subscriber movements and the presentation of calls between two transmission stations.

The test programs may therefore also contain instructions as to when and how telephones are to be operated and telephone movements simulated. This makes it possible to test a communications apparatus, even in conjunction with telephones of different manufacturers, and specific subscriber services can be automatically activated. Identification signals which identify respective telephones participating in a call can also be transmitted via the voice channels through the test apparatus, controlled by the test instructions. For this purpose, a voice channel is set up between each pair of telephones of a plurality of telephones in a conversation involving two telephones or a conference call involving three or more subscribers. A pattern of tone pulses that clearly identifies a first telephone and with a predetermined frequency is then transmitted via the voice channel from the first telephone. The reception of the tone-pulse pattern transmitted via the voice channel is monitored at a second telephone participating in the call. The transmission of the pattern of tone pulses takes place between the first and the second telephone in the presence of voice compression and voice decompression. The pattern of tone pulses is selected such that it is also possible to identify the first telephone when the pattern of tone pulses is received at the second telephone if voice compression and decompression is applied.

The correct switching of connections in the case of two-phone calls or conference calls can be established, registered and evaluated. This further enables long-term testing and comprehensive automatic "black-box" testing.

Furthermore, the central signal processing apparatus may be connected via the programmable data processing apparatus, which may be e.g. a commercially available computer, to a plurality of external programmable data processing apparatuses which likewise may be commercially available computers, via a network for data exchange. In this instance, the programmable data processing apparatus of the central signal processing apparatus acts as a server which is connected via a server process to the converter apparatus and which is connected via hierarchical communication processes, henceforth known as client processes, to a plurality of the external programmable data processing apparatuses or data display stations. Test instructions can therefore be executed with the plurality of these stations, conveying data via client processes to the server of the central signal processing apparatus; this server then generates digital control signals and transmits them as part of a server process to the converter apparatus, which in turn controls the interrupt apparatus within the transmission station or controls and monitors the telephones. This also makes it possible to locate the external data processing apparatuses remotely from the data processing apparatus of the central signal processing apparatus and to connect them therewith via e.g. a local area network (LAN) or via the internet, or via another remote data transmission apparatus. Test instructions therefore do not need to be executed locally, i.e. tests can also be performed over large distances (remote testing) and hence the test apparatus can be utilized more effectively.

Figure 4:
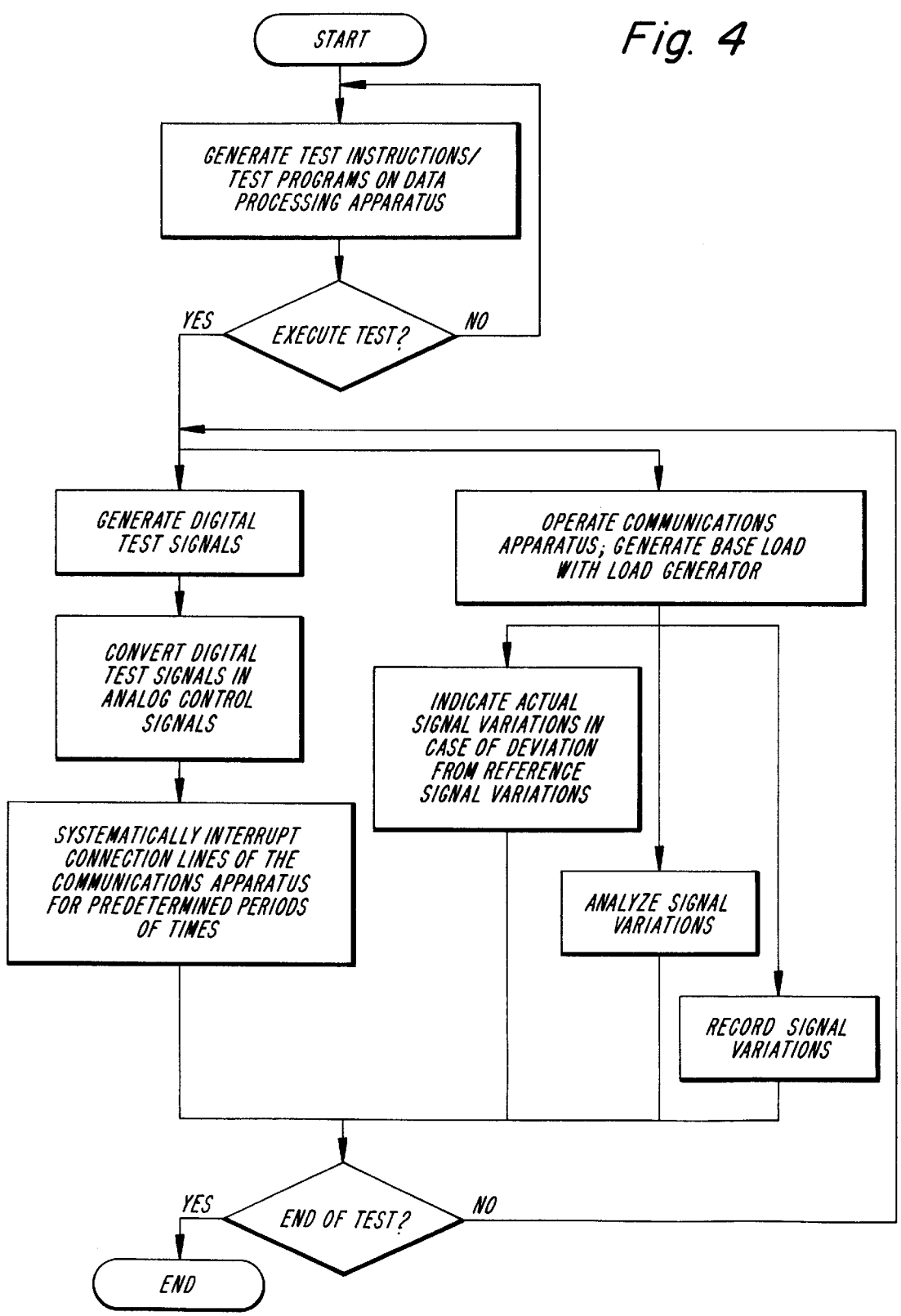
Figure 5:
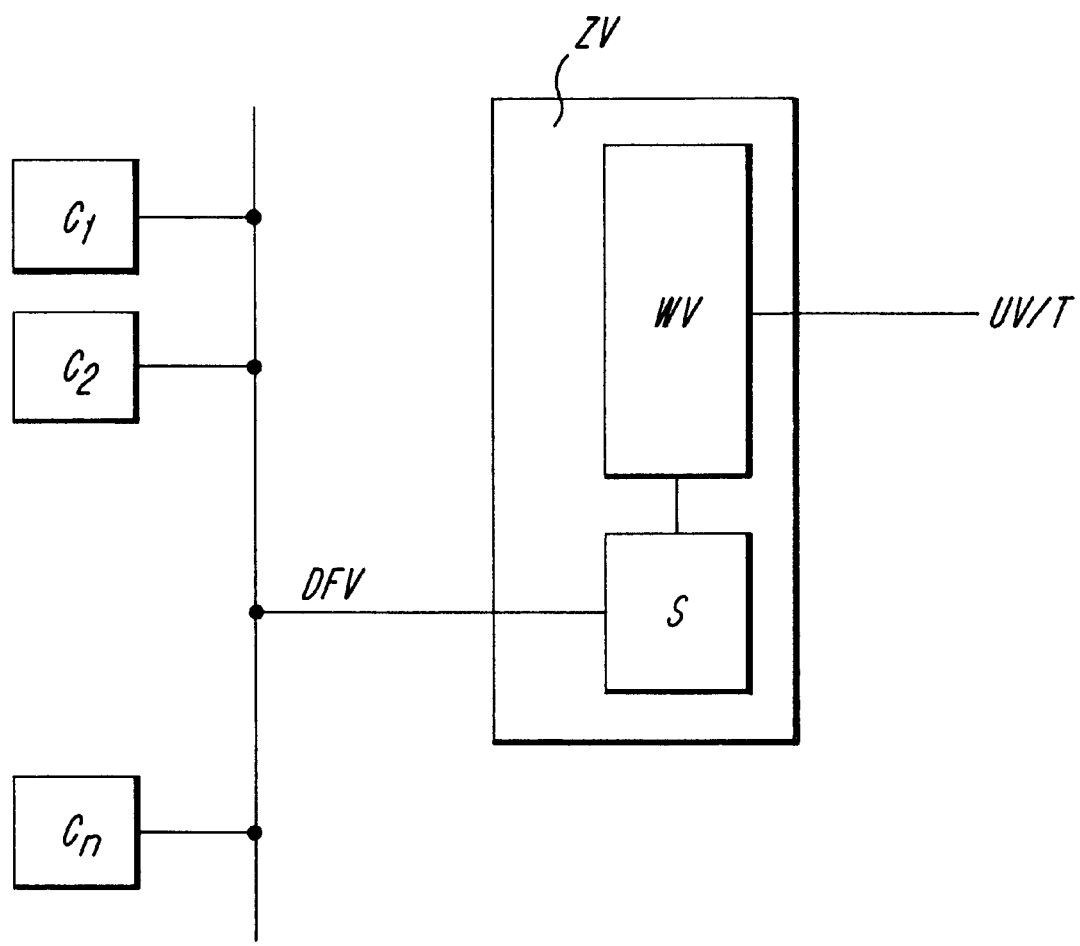
Figure 6:
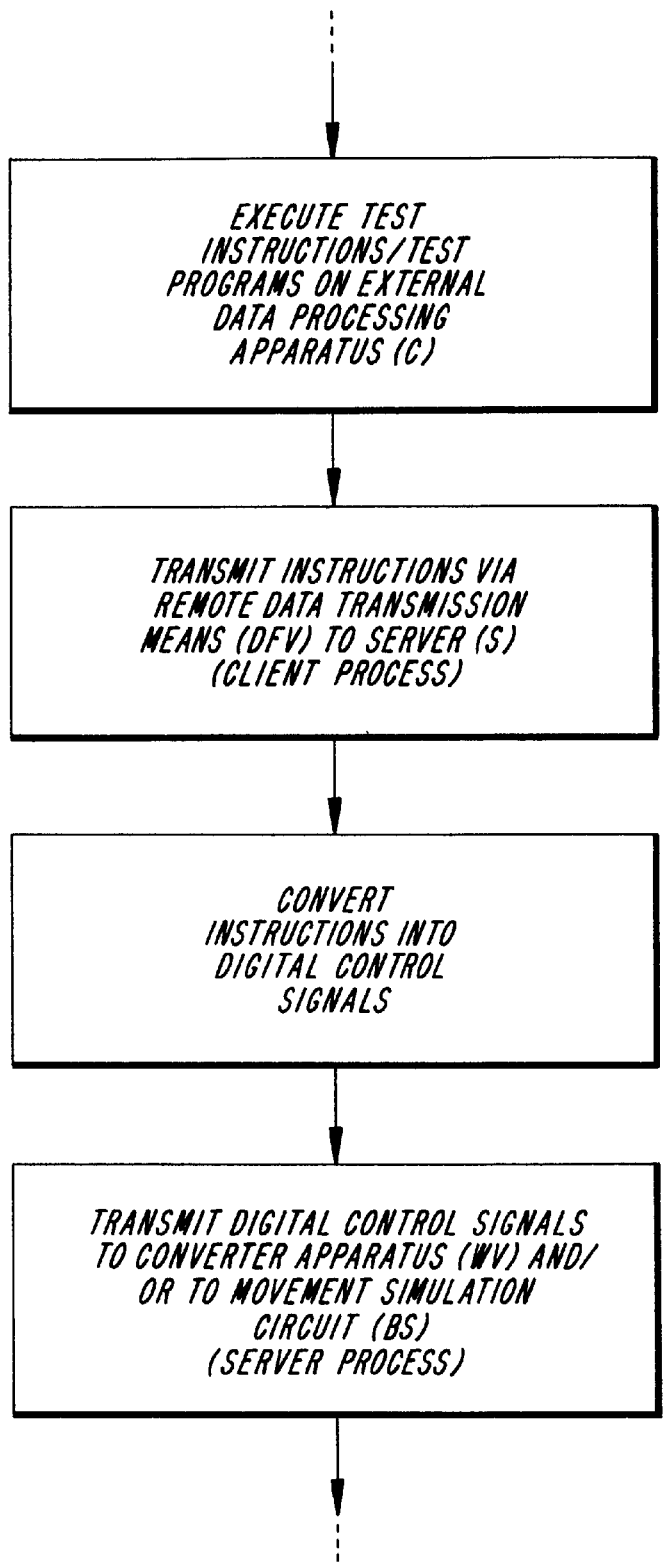
Figure 7:
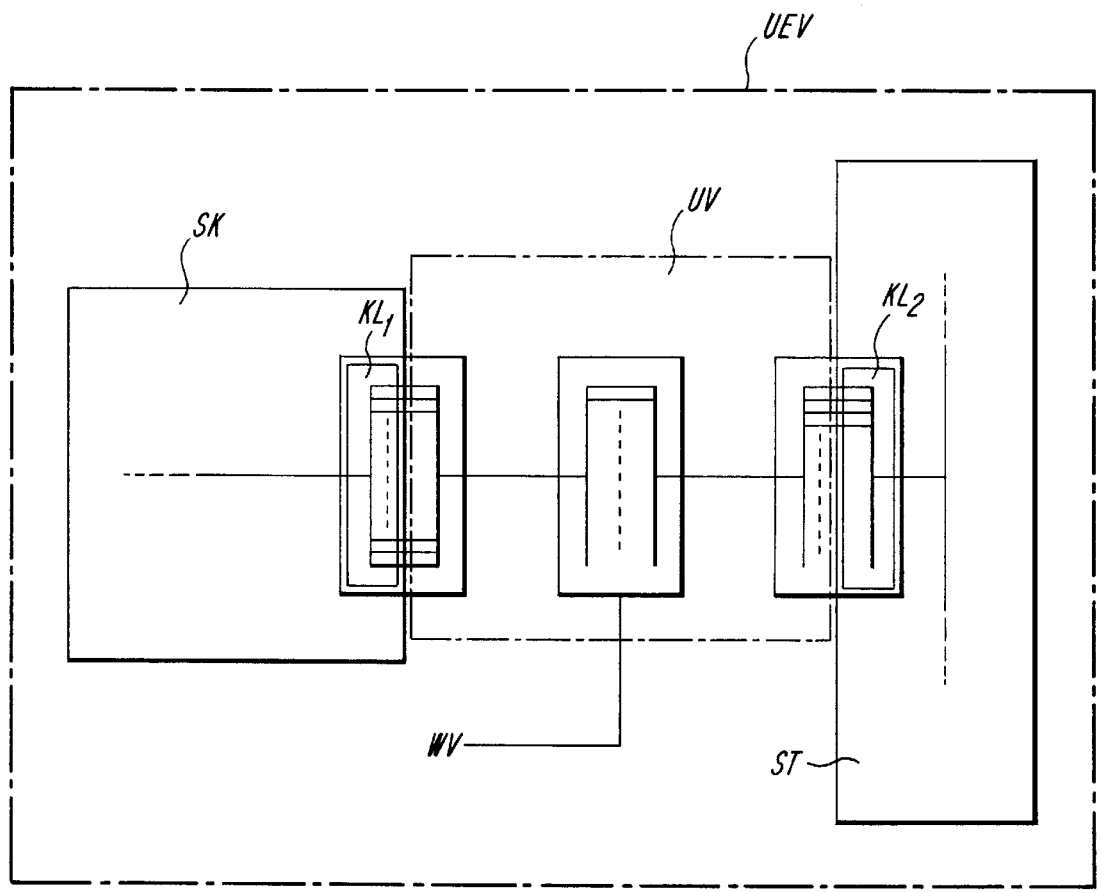
Figure 8:
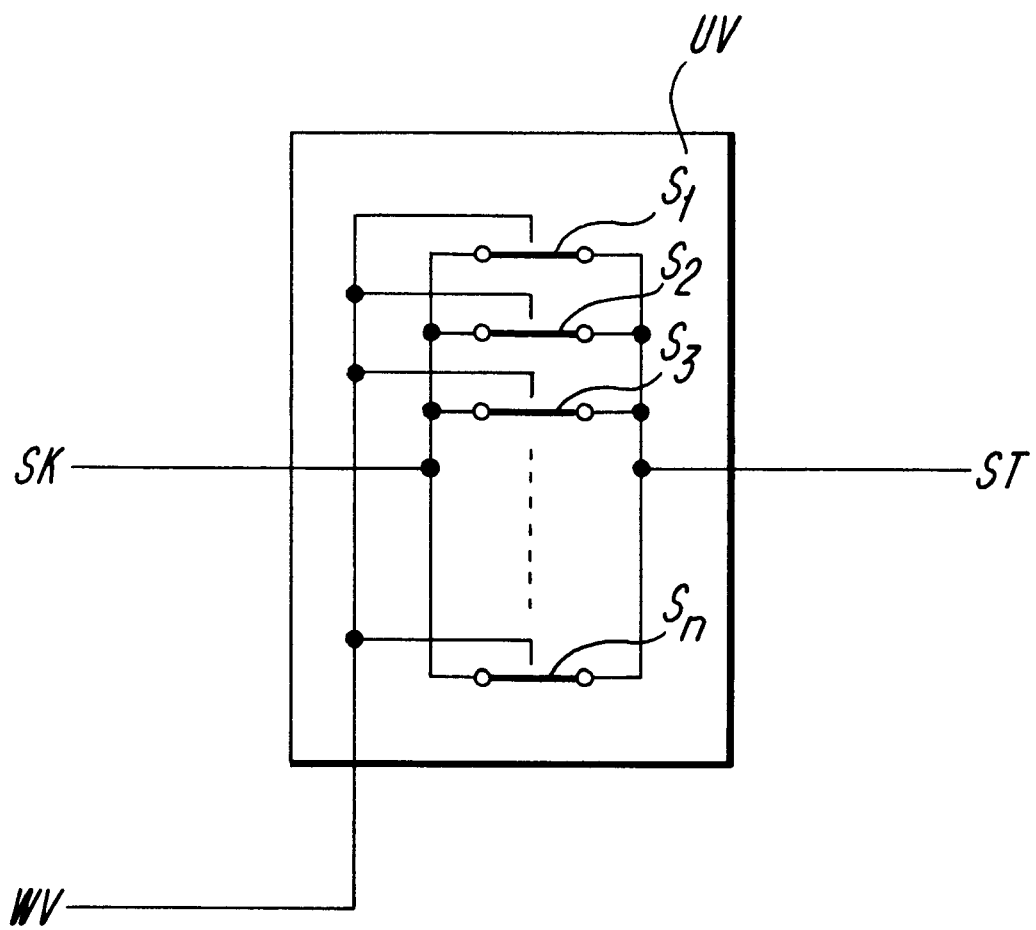
Figure 9:
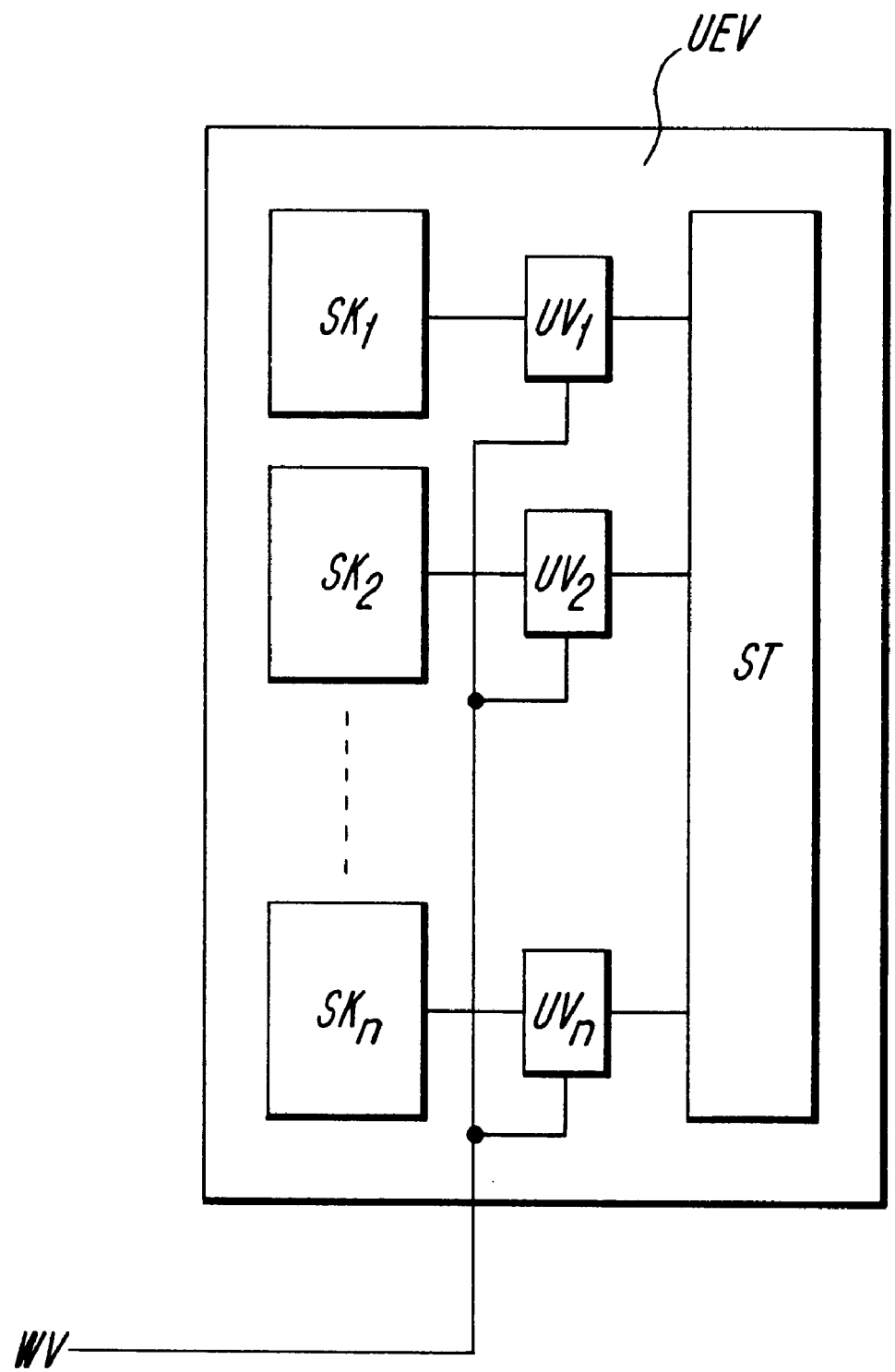
Figure 10:
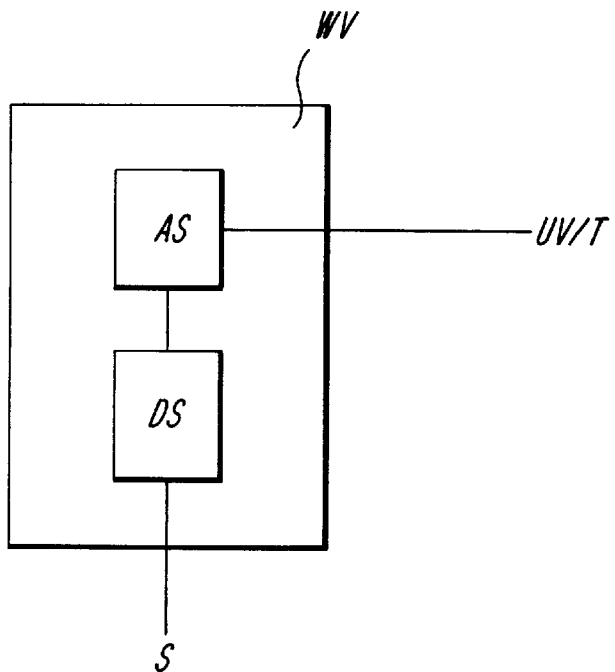
Figure 11:
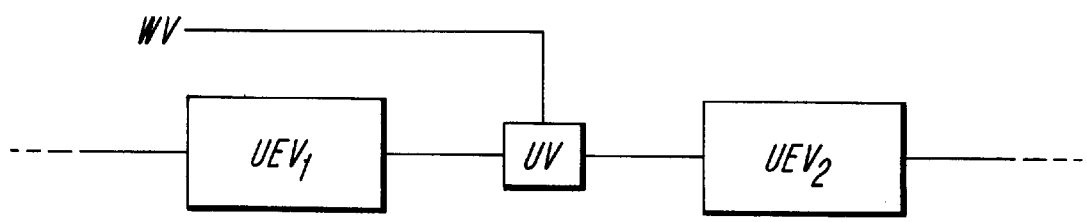
Figure 12:
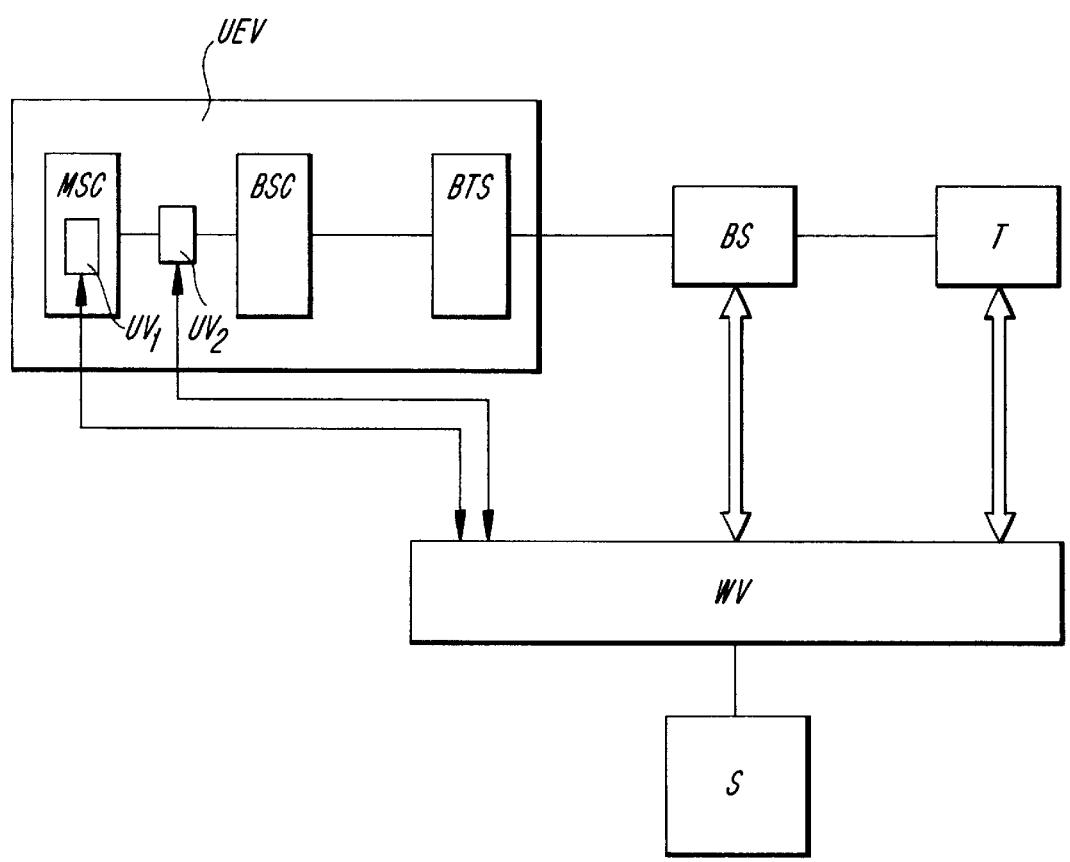

The invention is described in the following in relation to the specific embodiments shown in FIGS. 1 to 11. These show:

FIGS. block diagrams of embodiments of the 1 to 3 communication system,

FIG. 4 a flow diagram of a test sequence,

FIG. 5 a block diagram of part of a test apparatus,

FIG. 6 a flow diagram of part of a test sequence,

FIG. 7 a block diagram of an interrupt apparatus located in a transmission station, FIG. 8 a block diagram of part of an interrupt apparatus, FIG. 9 an arrangement of a plurality of interrupt apparatuses in a transmission station, FIG. 10 an example of a converter apparatus, FIG. 11 an example of an arrangement of an interrupt apparatus between transmission stations, FIG. 12 a block diagram of a communications system.

The following designations are used in FIGS. 1–12:

| | |
|---|---|
| KS | a communications system, |
| KV | a communications apparatus, |
| TV | a test apparatus, |
| $UEV_{1-n}$ | a transmission station, |
| S | a programmable data processing apparatus of a central signal processing apparatus (server), |
| WV | a converter apparatus, |
| $T_{1-n}$ | a telephone, |
| $C_{1-n}$ | an external programmable data processing apparatus, |
| DFV | a remote data transmission apparatus, |
| SK | a circuit card of the transmission station, |
| ST | a circuit card carrier of the transmission station, |
| KL | a contact strip, |
| DS | a digital control circuit, |
| AS | a conversion circuit, |
| BS | a movement simulation circuit, |
| ZV | a central signal processing apparatus, |
| MSC | a mobile service switching center, |
| BSC | a base switching center, |
| BTS | a base transceiver station. |

FIG. 1 shows the general structure of a communications system KS. The communications system KS comprises a communications apparatus KS and a test apparatus TV that are connected together. Selected components of the communications apparatus, telephones $T_1$ to $T_n$ and transmission stations $UEV_1$ to $UEV_n$, are also shown in FIG. 1. $T_1$ and $T_2$ designate mobile telephones, whereas $T_3$ includes a conventional fixed network telephone. Transmission stations $UEV_1$ and $UEV_2$ are also mobile telephone transmission stations which can set up radio communication connections to mobile telephones. Transmission station $UEV_3$ may be a transmission station of another communication network or another apparatus for transmitting data within a communication apparatus according to the present invention. The communication apparatus has to ensure, inter alia, that a called mobile telephone can be localized in the net so that if a mobile telephone moves out of a transmission station's catchment area during a call, the corresponding call can be passed on to another transmission station and certain user services can be activated. For the purposes of data exchange, the communication apparatus is connected to the test apparatus, by means of which test programs (i.e. one or more sequences of test cases with test commands from the test case generator) and/or test instructions, i.e. test commands for testing the communication apparatus, can be generated and executed.

Figure 2:
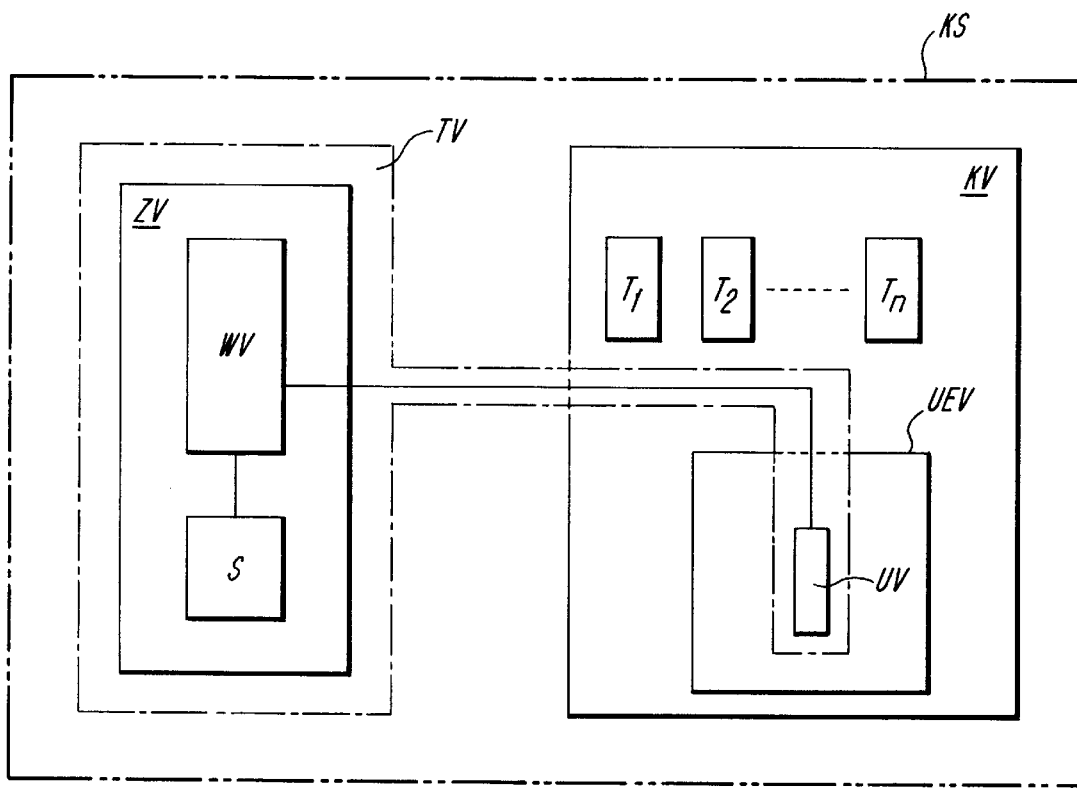

FIG. 2 shows a block diagram of another exemplary embodiment of a communications system according to the present invention. A test apparatus TV comprises a central signal processing apparatus ZV, arranged away from the communications apparatus KS. The test apparatus also comprises an interrupt apparatus UV which is arranged within a transmission station UEV of the communications apparatus in order to be able to interrupt a plurality of electrical connection lines of the transmission station UEV systematically or with precise temporal specifications. The interrupt apparatus UV is connected to a converter apparatus WV arranged in the central signal processing apparatus. The converter apparatus is connected to a programmable data processing apparatus S.

By means of the programmable data processing apparatus S, test instructions can be automatically generated or interactively generated by an operator. The converter apparatus converts the digital test signals generated in accordance with the test instructions into operating signals and transmits these operating signals to the interrupt apparatus UV, by means of which individual electrical connection lines or groups of electrical connection lines within the transmission station can be interrupted in accordance with the operating signals for specific time intervals.

The effects of interruptions on the communication system are simultaneously established by e.g. manual dialing, speaking, activating user services.

In another exemplary embodiment, effects of the interruptions can also be established via a polling station at the transmission station UEV.

Figure 3:
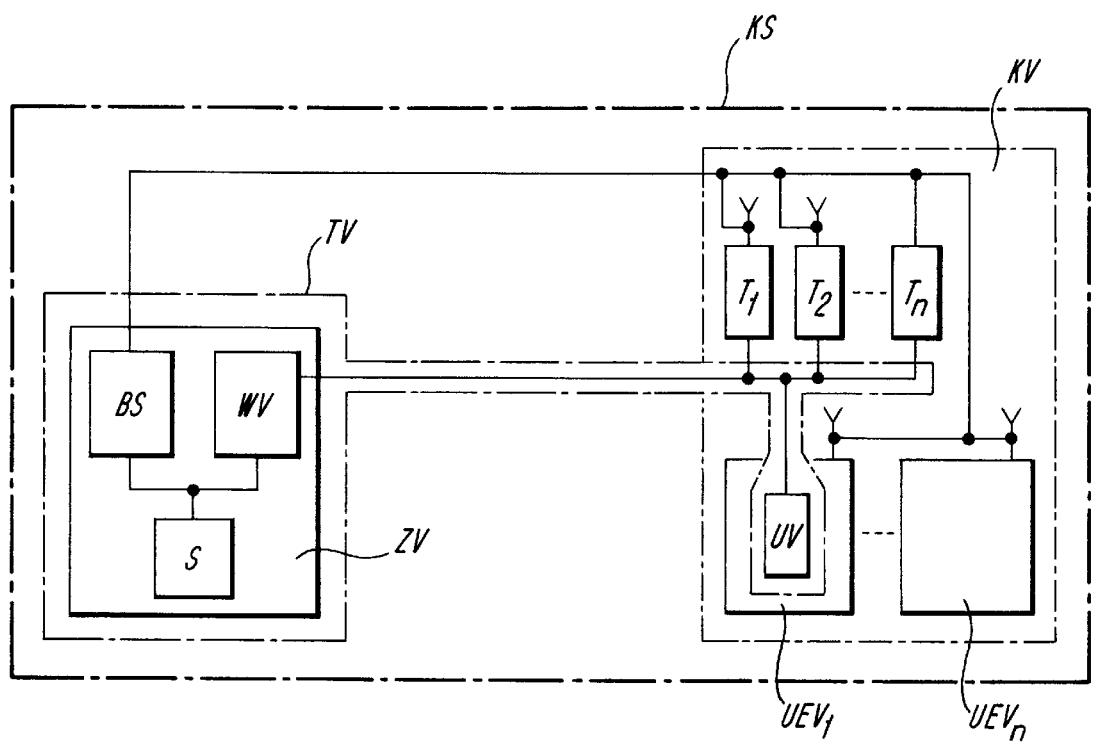

FIG. 3 shows another exemplary embodiment of a communication system according to the present invention. Connection or antenna cables of telephones $T_1$ to $T_n$ and transmission stations $UEV_1$ to $UEV_n$ are connected to a movement simulation circuit BS of the test apparatus, making it possible to simulate or reproduce mobile telephone movements and air paths. The converter apparatus is also connected to telephones $T_1$ to $T_n$ and to an interrupt apparatus UV within the transmission stations $UEV_1$ so as to control the telephones and interrupt apparatus on the basis of operating signals and to receive response signals from the telephones. The movement simulation circuit and converter apparatus are each connected to the programmable data processing apparatus S.

During testing, test instructions are supplied by the programmable data processing apparatus for operating the interrupt apparatus, as already described by means of FIG. 2, as well as test instructions for the mobile telephones' simulated movement between transmission stations. The converter apparatus also supplies operating signals for operating the telephones' keypads and microphones and receives response signals from the loudspeakers and call apparatuses of the telephones.

Attention is drawn to the fact that the connection or antenna cables of the telephones and interrupt apparatuses $UV_{1-n}$ do not have to be connected to the movement simulation circuit BS if no movement simulation is necessary. Additional interrupt apparatuses $UV_{1-n}$ may be provided in one or more transmission stations $UEV_{1-n}$.

FIG. 4 shows a flow diagram of a test process in a communications system according to FIG. 2. Instructions for testing the communications apparatus are generated in the programmable data processing apparatus S or in an external data processing apparatus $C_{1-n}$. Test instructions or test programs that are stored in a memory medium can also be called up and executed. If the execution of the test instructions/test programs is desired, digital test signals which are transmitted to the converter apparatus WV and converted there into operating signals are generated by the programmable data processing apparatus S. The operating signals control the interrupt apparatus UV. One or more of the electrical connection lines within the transmission station UEV is therefore systematically interrupted for defined time intervals. At the same time, the communication apparatus KS is operated, e.g. dialing, speaking or creation of a basic load with a load simulator. Signal changes are produced by the interruption of the connection line, these signal changes can be indicated when they differ from the corresponding reference signal changes. The signal changes can also be recorded or recorded data can be automatically evaluated in the programmable data processing apparatus S.

According to the communication system shown in FIG. 3, the network is also automatically operated by controlling test instructions/test programs. In this instance, digital test signals are converted by the data processing apparatus S within the converter apparatus WV into additional operating signals in order to operate the keypads and microphones of telephones $T_1$ to $T_n$. Operating signals, transmitted from the communications apparatus KS via voice channels, from the loudspeakers and operating signals from the call apparatuses of the telephones within the converter apparatus WV are also converted into digital operating response signals and are transmitted to the programmable data processing apparatus S and recorded or evaluated there.

Identification signals which identify respective telephones participating in a call are transmitted via the voice channels via the test apparatus TV, in a manner controlled by test instructions. For this purpose, a voice channel is set up between each pair of telephones of a plurality of telephones in a call involving two telephones or in a conference call involving three or more subscribers, and a pattern of tone pulses that clearly identifies a first telephone is transmitted via the voice channel based on the first telephone. The reception of the pattern of tone pulses transmitted via the voice channel is monitored in a second telephone participating in the call. The transmission of the pattern of tone pulses between the first and the second telephone takes place in the presence of voice compression and voice decompression, as is usual for example in GSM. The pattern of tone pulses is selected in such a way that it is also possible to identify the first telephone when the pattern of tone pulses is received at the second telephone if voice compression and voice decompression are used.

FIG. 5 shows a partial view of a test apparatus according to the present invention. A plurality of external data processing apparatuses or data display stations $C_1$ to $C_n$ is connected via a remote data transmission station DFV to the programmable data processing apparatus S. The external programmable data processing apparatuses $C_1$ to $C_n$ are clients, while the programmable data processing apparatus S is a server. In the exemplary embodiment depicted, test instructions or test programs can be generated and/or executed on the external data processing apparatuses.

FIG. 6 shows a flow diagram of a corresponding test process. Independent test programs or test instructions are executed on one or more of the external data processing apparatuses. The test instructions are transmitted by the external data processing apparatuses via the remote data transmission station DFV to the programmable data processing apparatus S (server) in a "client" process. In accordance with the instructions transmitted in the client process, the server S generates digital control signals that are transmitted to the converter apparatus or to the movement simulation apparatus in a "server" process.

FIG. 7 shows a block diagram for the arrangement of an interrupt apparatus in a transmission station. The interrupt apparatus is interconnected between the contact strips $KL_1$ and $KL_2$ of a circuit card SK or of a circuit card carrier ST that are normally directly connected together. In this way, individual line connections between the circuit card carrier ST and circuit cards SK can be systematically interrupted for specific time intervals.

Unlike in the depicted exemplary embodiment, a plurality of circuit cards and numerous interrupt apparatuses can also be provided in the transmission station.

FIG. 8 shows a further example of an interrupt apparatus. Controllable switches are designated by $S_1$ to $S_n$. Individual or several of the switches can be opened by operating signals from the converter apparatus WV for specific time intervals. In this way, connection lines between a circuit card and a circuit card carrier are interrupted.

FIG. 9 shows another view of an arrangement of interrupt apparatuses. The transmission stations includes a plurality of circuit cards $SK_1$ to $SK_n$ that are connected to a circuit card carrier ST via a plurality of interrupt apparatuses $UV_1$ to $UV_n$ each controllable by the converter apparatus.

FIG. 10 shows an exemplary embodiment of a converter apparatus WV. A digital control circuit DS is connected to a conversion circuit AS. The digital control circuit DS is fitted with logic circuits and memories in which special configuration files for telephones etc. are stored for transmission stations UEV in order to adapt converter apparatus WV. The circuit is fitted with logic and filters necessary for generating operating signals. By using the configuration files stored in memory apparatuses of the digital control circuit DS, test instructions received by the programmable data processing apparatus S are converted by the digital control circuit DS into digital control signals which are transmitted to conversion circuit AS. In the conversion circuit, the digital control signals are converted into analog operating signals adapted to the respective target apparatuses (telephones of various manufacturers, various types of transmission station) and which are then transmitted so as to operate interrupt apparatuses UV in transmission stations UEV or are transmitted to selected telephones.

FIG. 11 shows an exemplary embodiment of part of a communications apparatus KS. An interrupt apparatus UV is arranged in such a way that it can interrupt electrical connections between different transmission stations UEV. For this purpose, the interrupt apparatus UV is arranged between two transmission stations UEV. Further interrupt apparatuses UV can also be arranged between further transmission stations UEV.

FIG. 12 shows a block diagram of another exemplary embodiment of a communications system. The transmission station UEV is a GSM transmission station that contains a mobile services switching center MSC, a base switching center BSC and a base transceiver station BTS for transmitting signals in the communications apparatus KS. A movement simulation circuit BS is connected between a base transceiver station BTS and the mobile telephone T; this BS circuit simulates movements of the mobile telephone T in a manner controlled by the converter apparatus WV. The telephone T and interrupt apparatuses $UV_1$ and $UV_2$ are also connected to the converter apparatus WV so as to be controlled by operating signals from the converter apparatus WV, and to transmit response signals to the converter apparatus WV. The converter apparatus WV is controlled by a programmable data processing apparatus S, as already described on the basis of FIG. 2.

What is claimed is:

1. A communications system, comprising:
   a telephone communications apparatus (KV) that contains a plurality of telephones ($T_1$ to $T_n$), particularly mobile telephones, a plurality of electrical connection lines, as well as at least one transmission station (UEV) for transmitting signals in said telephone communications apparatus (KV);
   a test apparatus (TV) for testing said telephone communications apparatus (KV) in an operational load condition, comprising:
      a central signal processing apparatus (ZV) having
         at least one programmable data processing apparatus (S) by which test commands for testing said telephone communication apparatus (KV) are supplied; and
         a converter apparatus (WV) connected to said programmable data processing apparatus (S) and designed to convert digital signals, generated by said programmable data processing apparatus (S) by controlling said test commands, into operating signals; and
      at least one interrupt apparatus (UV) connected to said converter apparatus (WV) and designed to interrupt systematically, in accordance with said operating signals, individual or groups of electrical connection lines for time intervals predetermined by said operating signals of said converter apparatus (WV), wherein
         on account of said systematic interruptions in said telephone communication apparatus (KV), signal changes are produced which can be signaled when there is a deviation from associated reference signal changes.

2. A communications system according to claim 1, wherein individual or groups of electrical connection lines arranged within at least said one transmission station (UEV) and/or between different transmission stations (UEV)can be interrupted by said interrupt apparatus (UV).

3. A communications system according to claim 1, wherein response signals obtained from said transmission station (UEV) can be converted into digital operating response signals by said converter apparatus (WV).

4. A communications system according to claim 1, wherein said converter apparatus (WV) is designed
   to control operatively the keypads and microphones of said telephones ($T_n$) by said programmable data processing apparatus (S) by controlling further test instructions; and
   to convert response signals received from loudspeakers and call apparatuses of said telephones ($T_n$) into digital operating response signals and to transmit them to said programmable data processing apparatus (S) and to store them there.

5. A communications system according to claim 1, wherein said test apparatus (TV) also comprises a connection apparatus through which said converter apparatus (WV) is connected to each of said telephones ($T_1$–$T_n$), and through which said operating signals are transmitted from said converter apparatus (WV) to selected telephones ($T_n$) and response signals are transmitted from telephones ($T_n$) dialed by these signals or from the selected telephones ($T_n$) to said converter apparatus (WV).

6. A communications system according to claim 5, wherein said connection apparatus comprises:
   an adapter on said telephone connected to the telephone's keypad, microphone, loudspeaker and call apparatus; and
   a detachable connection line provided between said adapter on said telephone and said converter apparatus.

7. A communications system according to claim 1, wherein said converter apparatus (WV) comprises a memory apparatus, and data specific to the telephone and/or to the transmission station are stored in configuration files of said memory apparatus of said converter apparatus (WV), thereby adapting said converter apparatus (WV) to different telephones and/or transmission stations (UEV).

8. A communications system according to claim 1, wherein said programmable data processing apparatus (S) of said central signal processing apparatus (ZV) is connected via a remote data transmission apparatus (DFV) to a plurality of external programmable data processing apparatuses ($C_1$–$C_n$) and/or data display apparatuses.

9. A communications system according to claim 8, wherein a local network (LAN) is provided for remote data transmission.

10. A communications system according to claim 8, wherein an internet is provided for remote data transmission.

11. A communications system according to claim 1, wherein said at least one interrupt apparatus (UV) is arranged between contact strips (KL1) of at least one circuit card (SK) and contact strips (KL2) of a circuit card carrier (ST) of said transmission station (UEV).

12. A communications system according to claim 11, wherein a plurality of circuit cards is connected together in series and each comprises its own address, and that said circuit cards can be controlled via a single control line.

13. A communications system according to claim 1, wherein said at least one interrupt apparatus (UV) is arranged on the respective front end of said circuit cards (SK) of said transmission station (UEV) connected to a circuit card carrier (ST).

14. A communications system according to claim 1, wherein said transmission station (UEV) is a GSM transmission station comprising a mobile service switching center (MSC), a base switching center (BSC) and a base transceiver station (BTS).

15. A method of testing, under operational load conditions, a telephone communications apparatus which contains a plurality of telephones ($T_1$–$T_n$), particularly mobile telephones, a plurality of electrical connection lines and at least one transmission station (UEV) for transmitting signals in said telephone communication apparatus (KV), comprising the steps:
   generating and executing test instructions with a programmable data processing apparatus (S) of a central signal processing apparatus (ZV) for testing said telephone communication apparatus (KV);
   transmitting digital test signals generated according to test commands to a converter apparatus (WV) and converting said digital test signals into operating signals for systematically interrupting at least one electrical connection line of said plurality of electrical connection lines;

transmitting said operating signals from said converter apparatus (WV) to an interrupt apparatus (UV) and operationally controlling said interrupt apparatus (UV) according to said operating signals to interrupt at least one electrical connection line for time intervals predetermined by said operating signals, comparing actual signal changes produced on account of said systematic interruptions with associated reference signal changes and signaling deviations of said actual signal changes from said reference signal changes.

16. A method of testing a telephone communications apparatus according to claim 15, with the steps of:

operationally controlling the keypads and microphones of said telephones by means of said converter apparatus (WV) by controlling further test commands; and receiving response signals from loudspeakers and call apparatuses of said telephones and converting said response signals into digital operating signals, and transmitting said digital operating response signals to said programmable data processing apparatus (S).

17. A method of testing a telephone communications apparatus according to claim 15, with the steps of:

transmitting operating signals from said converter apparatus (WV) to telephones selected according to said test commands via a connection apparatus; and transmitting response signals of dialed telephones to said converter apparatus via said connection apparatus.

18. A method of testing a telephone communications apparatus according to claim 15, wherein data are transmitted via a remote data transmission apparatus (DFV) between said programmable data processing apparatus (S) of said test apparatus (TV) and a plurality of external programmable data processing apparatuses ($C_1$–$C_n$) and/or data display apparatuses.

19. A method of testing, under operational load conditions, a telephone communications apparatus which contains a plurality of telephones ($T_1$–$T_n$), particularly mobile telephones, a plurality of electrical connection lines and at least one transmission station (UEV) for transmitting signals in said telephone communication apparatus (KV), comprising the steps:

generating and executing test instructions with a programmable data processing apparatus (S) of a central signal processing apparatus (ZV) for testing said telephone communication apparatus (KV);

transmitting digital test signals generated according to test commands to a converter apparatus (WV) and converting said digital test signals into operating signals for systematically interrupting at least one electrical connection line of said plurality of electrical connection lines;

transmitting said operating signals from said converter apparatus (WV) to an interrupt apparatus (UV) and operationally controlling said interrupt apparatus (UV) according to said operating signals to interrupt at least one electrical connection line for time intervals predetermined by said operating signals, comparing actual signal changes produced on account of said systematic interruptions with associated reference signal changes;

signaling deviations of said actual signal changes from said reference signal changes;

setting up a voice channel between each pair of telephones of a plurality of telephones ($T_1$ to $T_n$) in a call involving two parties or a conference call involving three or more participants;

on the basis of a first telephone, repeatedly transmitting with a predetermined frequency via said voice channel a pattern of tone pulses that clearly identifies said first telephone, and having a second telephone participating in the call monitor the reception of said first telephone's pattern of tone pulses transmitted via said voice channel;

wherein the transmission of said pattern of tone pulses between said first and second telephones includes voice compression and voice decompression; and said pattern of tone pulses being selected such that an identification of said first telephone is possible when said pattern of tone pulses is received at said second telephone if voice compression and voice decompression are used.

20. A method of testing a telephone communications apparatus according to claim 19, with the steps of:

operationally controlling the keypads and microphones of said telephones by means of said converter apparatus (WV) by controlling further test commands; and receiving response signals from loudspeakers and call apparatuses of said telephones and converting said response signals into digital operating signals, and transmitting said digital operating response signals to said programmable data processing apparatus (S).

21. A method of testing a telephone communications apparatus according to claim 19, with the steps of:

transmitting operating signals from said converter apparatus (WV) to telephones selected according to said test commands via a connection apparatus; and transmitting response signals of dialed telephones to said converter apparatus via said connection apparatus.

22. A method of testing a telephone communications apparatus according to claim 19, wherein data are transmitted via a remote data transmission apparatus (DFV) between said programmable data processing apparatus (S) of said test data processing apparatuses ($C_1$–$C_n$) and/or data display apparatuses.

* * * * *